United States Patent Office 3,007,802
Patented Nov. 7, 1961

3,007,802
METHOD OF REMOVING HAEMOCYANIN FROM CRUSTACEA
Isami Osakabe, Tokyo, Japan, assignor to Nippon Kanikanzume Yushutsu Suisangyo Kumiai, Tokyo, Japan, a corporation of Japan
No Drawing. Filed Jan. 2, 1958, Ser. No. 706,570
3 Claims. (Cl. 99—195)

This invention relates to a method for removing the haemocyanin of Crustacea and is more particularly directed to a method of removing haemocyanin from the meat of such Crustacea as crabs, lobsters or the like in the process of canning or freezing the same.

According to the present invention, a crab or a lobster that is to be processed for food and in which the body fluid (the blood) contains blue-colored hematin (haemocyanin), has the viscera removed and parts of its shell and the like and is washed, as the first step, in the usual way, and then the same is cooked or heated under such condition that both the body fluid and the haemocyanin which is the principal ingredient of said fluid are not coagulated by heat but the muscles are coagulated by heat. For example a crab is cooked at a temperature from 40 to 70° C. for a period of from several to over 30 minutes, whereby not only the myosin occupying the greater parts of the muscles but also the myogen which is relatively small in amount are prefectly denatured by thermal coagulation while the body fluid and the haemocyanin contained therein remain in a state of liquid without being thermally coagulated. Hereupon, the muscles and the shell are in an easily separatable state owing to the thermal shrinkage of the muscles by the thermal denaturation thereof, so that the meat may be easily taken out of the shell and tendon. Further, even when it is cooked at a temperature of from 95 to 100° C. for a period of from 20 to 60 seconds, the temperature thereof rises only to a lower temperature than the thermal coagulating point of haemocyanin owing to the shortness of the heating period, and so only the muscles are thermally coagulated and the meat may be readily taken out of the shell. The meat thus taken out is accompanied by the body fluid or the like which still remains in a state of liquid without causing the thermal coagulation, but this fluid or the like may be easily removed by washing or the like. The separation of the muscles of a crab from its shell, while in a raw state, is industrially almost impossible. The meat from the heated crab thus obtained causes no blue-change phenomenon even when it is placed at normal temperature for a long period or is heated to a temperature of 100° C. or is stored by being cooled or frozen to a temperature of 2 C. below zero, because there remains no body fluid therein. Further, no blue-change phenomenon can be found when the same is processed into canned provisions.

The cooking method heretofore in use is such that a raw crustacean is cooked at a higher temperature than the thermal coagulating point of the body fluid and for a long period, for example, at a temperature of 100° C. and for a period from several to over 30 minutes. The meat cooked by this method is not in such a state as to permit the ready separation of the liquid body from the solid body as is meat treated according to the present invention but is in a state where the solid bodies firmly adhered to each other, because both the body fluid and the haemocyanin contained therein are both coagulated by heat as to be firmly connected with each other. Therefore, the haemocyanin contained in the body fluid remains in large quantities in the meat so that, when the meat is left for a long period or is frozen or is canned, there results blue-meat which makes the appearance, color and flavor of the meat deteriorate.

It has been determined from my research and the experimental results of other researchers that the cause of the blue-change phenomenon is the oxidation of haemocyanin (blue-colored hematine) that is peculiar to the Crustacea. However there has been no known research relative the thermal coagulating points of the body fluid of a crustacean and the haemocyanin contained in said fluid and that of the muscles of the same. These coagulating points have generally been believed to be almost of the same degrees, and further, it has been believed by merely observing their physiological clotting that the thermal coagulating points of both the body fluid and the haemocyanin contained therein are lower than that of the muscles. According to the result of my research, however, it has been experimentally clarified that there is a temperature difference of about 20° C. between the thermal coagulating points of the body fluid of a crab and the muscles of the same as is shown in the following Tables 1 and 2. Namely, the myosin occupying the greater parts of the muscles of a crab begins to coagulate at about 43° C. and nearly ends at about 50° C. While, both the body fluid of a crab and the haemocyanin contained therein are thermally coagulated at about 70–71° C. and clearly has a temperature difference of about 20° C. from the muscles.

Table 1.—*Thermal coagulating temperature of crab's muscles*

| Sample No. | Beginning temperature of coagulation, °C. | Conclusion temperature of coagulation, °C. |
|---|---|---|
| No. 1 | 43.3 | 50.2 |
| No. 2 | 42.8 | 49.5 |
| No. 3 | 43.2 | 50.3 |
| No. 4 | 44.0 | 48.2 |
| Mean | 43.3 | 49.3 |

Table 2.—*Thermal coagulating temperature of crab's body fluid (blood) and pure haemocyanin*

| Sample No. | Coagulating temperature of blood, °C. | Coagulating temperature of pure haemocyanin, °C. |
|---|---|---|
| No. 1 | 67.6 | 70.8 |
| No. 2 | 69.8 | 70.7 |
| No. 3 | 70.3 | 71.2 |
| No. 4 | 69.6 | 70.6 |
| No. 5 | 70.6 | 69.9 |
| Mean | 69.6 | 70.7 |

By putting this difference of the coagulating temperatures skillfully and theoretically into practice, the muscles may be readily separated from the body fluid and the haemocyanin. To place the cooked muscles and the body fluid or the haemocyanin into an easily separatable state between a solid body and a liquid body in view of the above-mentioned facts is the principal feature of the present invention. In order that the invention may be more easily understood, some examples thereof will be explained as follows:

EXAMPLE 1

One hundred *Erimacurus isenbeckii*, the gross weight thereof being about 45 kgs., are removed of their shells and viscera in the usual way, whereby about 30 kgs. of the shoulder and leg portions are obtained. After each of these portions is cut at the place between the shoulder portion and the first leg portion and is cut off the nail at the tip of the third leg portion, they are washed in sea-water of a temperature from 10 to 13° C. for 6 minutes. Then, a half by weight, of them, namely, 15 kgs. of the same are put in a cooking liquid of 54° C. and the other half are put in a cooking liquid of 69.5° C. After the former are kept at said temperature of 54° C. for 6 minutes and the latter are kept at said temperature of 69.5° C. for 4 minutes, both of them are cooled by water of about 10° C. for 5–8 minutes, and then the meat thereof is taken out by cutting operation in the usual way. Then the meat of the former and that of the latter are severally put in their respective bamboo-baskets and are washed in sea-water of about 10° C. for several minutes for washing away their body fluid still remaining in a state of liquid, whereby the haemocyanin that is the cause of the blue-change phenomenon is completely removed. Thereafter, the meat of the first leg portions and that of the shoulder portions are heated for two and a half minutes in a cooking liquid of 95–100° C., while the meat of the second and the third legs portions and the broken meat produced in the foregoing process are cooked for one and a quarter minutes in a cooking liquid of almost the same temperature, and then each 250 grs. thereof after being cooled, is packed in a can and is sterilized by steam for 90 minutes under a pressure of 6 lbs. in the usual way, whereby 50 cans are obtained. When these are opened for inspection after being incubated at a temperature of 37° C. for 20 days, it has been noted that these are, on an average, 193 grams in solid amount, 52 grams in juice amount, 7.1 in pH value, 7 inches in vacuum degree, excellent in appearance and flavor and free from blue-meat.

As will be seen by this example, almost the same desirable results have been obtained at either 69.5 or 54° C., so long as the cooking is performed at a lower temperature than the thermal coagulating points of both crab's body fluid or blood and the haemocyanin contained therein. In this case, therefore, what temperature is selected and how many minutes or seconds long the cooking is performed under such heating condition so that there results no thermal coagulation of body fluid, is to be decided in view of the kind, size, fleshness and number of the crabs to be treated, the size and construction of the cooker to be used and the like.

EXAMPLE 2

This example is concerned with processing frozen crabs. 3.9 kgs. of *Paralithodes camtschatica* are washed in sea-water of 10° C. and given a preliminary treatment in the usual way. Namely, they are removed from their shells and viscera washed in sea-water, cut at every joint of their shoulder and leg portions, and then washed again, whereby 2.4 kgs. of the same are obtained. These are equally divided into four parts Nos. 1, 2, 3 and 4 each of which is 0.6 kgs. in weight. Then, these are cooked respectively as follows:

No. 1 is cooked at 54° C. for 6 minutes.
No. 2 is cooked at 64° C. for 5 minutes.
No. 3 is cooked at 69.5° C. for 15 minutes.
No. 4 is cooked at 100° C. for 26 seconds.

After these are cooked and then cooled, the meat thereof is removed and is washed again for removing the body fluid which has not been coagulated and still remains in a liquid state. No. 2 is cooked for 5 minutes at 100° C. and is cooled. Next, these parts are frozen in a refrigerator at a temperature of 16° C. below zero. Then, these are melted by air at room temperature for the purpose of inspecting their quality. As the result thereof, it has been found that No. 1 and No. 4 are distasteful when eaten, as they are, because they were frozen in a state of being half-cooked, but they are tasteful when eaten after being cooked at 100° C. and further No. 2 and No. 3 are similarly tasteful. Thus, there may be obtained frozen crab meat which is free from the blue-change phenomenon and is excellent in touch and flavor in comparison with the one which is obtained by freezing the meat that is washed completely for preventing the occurrence of blue-meat after being cooked at a high temperature for a long period in accordance with the former method.

As have been particularly described, the method of the present invention is especially characterized by the cooking operation making the muscles of a crustacean coagulate by heat without causing the thermal coagulation of both the body fluid and the haemocyanin so as to facilitate the removal of the body fluid and the like.

What I claim is:

1. A method of removing haemocyanin from Crustacea consisting in cooking a crustacean for a period not exceeding 30 minutes at a temperature between the thermal coagulating point of the muscles of the crustacean, which is about 50° C., and that of the body fluid of the same, which is about 70° C., so that the body fluid and the haemocyanin contained therein are not coagulated by heat but the muscles are coagulated thereby, then removing the meat from the shell thereof, and thereafter washing said meat with liquid for washing away therefrom the body fluid and the haemocyanin both still remaining in a liquid state.

2. A method of preparing crustaceans as a frozen food consisting in cooking the crustaceans at a temperature of from 50° C. to 70° C. for not more than 30 minutes, then removing the meat from the shells thereof, thereafter washing said meat for washing therefrom the body fluid and the haemocyanin remaining in liquid state, and then freezing said meat.

3. A method of preparing crustaceans consisting in submitting crustaceans to a liquid at a temperature of from 95° C. to 100° C. for a time of between 20 to 60 seconds coagulating the muscles, but not the body fluid and haemocyanin and thereafter separating the body fluid and haemocyanin from the muscles.

References Cited in the file of this patent

UNITED STATES PATENTS

| | | |
|---|---|---|
| 1,927,123 | Howe | Sept. 19, 1933 |
| 2,381,019 | Webb | Aug. 7, 1945 |
| 2,600,627 | Envoldsen | June 17, 1952 |
| 2,608,716 | Harris | Sept. 2, 1952 |
| 2,765,236 | Blaine | Oct. 2, 1956 |